United States Patent Office 3,671,093
Patented June 20, 1972

3,671,093
BEARING, PARTICULARLY FOR THE DRIVING MEANS OF AN OSCILLATING TOOL
Karl Wieck, Stuttgart, Germany, assignor to SUPFINA, Wieck & Hentzen, Remscheid, Germany
Filed July 30, 1970, Ser. No. 59,515
Int. Cl. F16c 19/02
U.S. Cl. 308—183                      6 Claims

ABSTRACT OF THE DISCLOSURE

In a bearing assembly for a shaft oscillating with an amplitude of less than 360°, in order to eliminate localized wear of the track and rollers of the roller bearing forming part of the assembly, one of the races of said roller bearing is caused to rotate unidirectionally, driven by a freewheeling member connected to the oscillating shaft or its oscillating driving means.

BACKGROUND OF THE INVENTION

This invention relates to a bearing assembly, including at least one roller bearing, particularly for the driving means of an oscillating tool.

In roller bearings, the rollers and the roller tracks normally executing a great number of unidirectional revolutions, wear evenly. In case of a periodically reversed rotary motion, an even wear is still ensured if the rotation in either direction amounts to at least one full revolution. In case, however, the reversal of motion occurs upon less than 360° of rotation, the wear of the roller track is locally limited. This phenomenon which increases in intensity as the angle of rotation decreases and the frequency of oscillation increases, prevents a playless support of driving spindles for oscillating tools, such as honing stones, which, for example, in case of precision machining of roller tracks of ball bearing races, oscillate about the center of the groove contour.

The freedom from play which has to comply with particularly stringent requirements when used in oscillating drives of the aforenoted type, may be achieved in case of drives provided with roller bearings, by forming the spindle bearing of two oblique ball bearings or oblique roller bearings urged against one another with a predetermined force. The preload resulting in such a clamping force must be large enough to ensure under all operating conditions and loads an optimal freedom from play. If, by virtue of wear the said force decreases, it should be readjusted.

The roller track of a bearing associated with a high frequency oscillating drive, very rapidly develops a substantial wear over a small range corresponding to the amplitude of the oscillation. Externally of this area, the track is substantially unworn. In such a case, an aforenoted readjustment of the clamping force is not possible because the roller bodies, in the position of their inversion points, arrive on unworn track portions where the space between the races narrows. In this manner, a jamming may occur which could result in an uneven operation. Furthermore, subsequent to an extended small angle operation, it is not possible to change to an oscillation of larger amplitude; so much less so since the roller bodies too lost their precise circular outline. At each inversion point, the roller bearing jams which has a disadvantageous effect not only on the drive means but also on the quality of the machining.

OBJECT AND SUMMARY OF THE INVENTION

It is an object of the invention to provide a bearing from which the aforenoted disadvantage is eliminated.

The invention is based on the recognition that an even wear of the roller tracks and roller bodies may be achieved if the inversion points of the rolling motions of the roller bodies on their tracks advance in one or the other direction relative to the races. Stated in different terms, an even wear may be achieved if the race, rotatable relative to the drive means of the tool, is caused to execute a rotary motion by virtue of which the path of travel of the individual rollers on the race is shorter in one direction than it is in the other. The reason for this occurrence is the fact that said path of travel is larger in one direction and smaller in the other by the length through which the race, rotatable relative to the drive means of the tool, simultaneously travels during its rotary motion.

Accordingly, based on the afore-outlined recognition, the roller bearing race rotatable relative to the drive means of the tool is rotatably supported with respect to its stationary carrier and further, means are provided for effecting its unidirectional rotary motion.

The invention will be better understood as well as further objects and advantages will become more apparent from the ensuing detailed specification of two exemplary embodiments of the invention taken in conjunction with the drawing.

DESCRIPTION OF THE EMBODIMENTS

Figure 1:
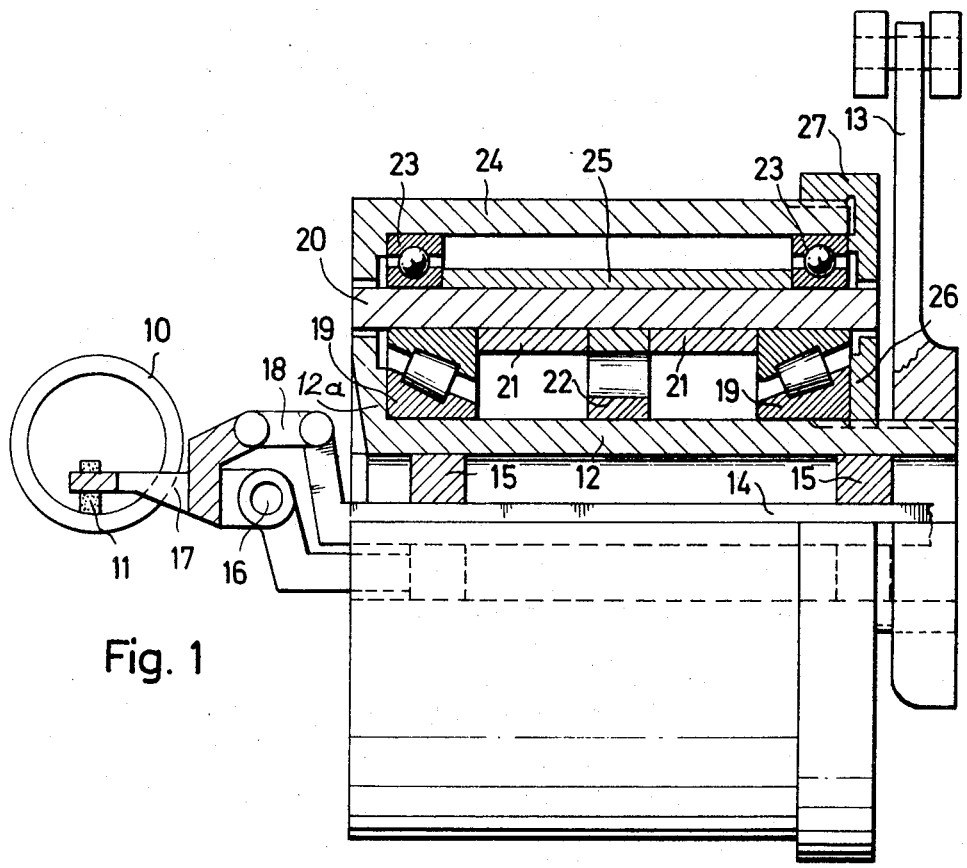
FIG. 1 is an axial, sectional view of a first embodiment of the invention.

Turning now to FIG. 1, a hollow shaft 12, as an oscillating part, serves as a driving means for a honing stone 11, or other work-engaging tool, working the face of a workpiece which may be, for example, the ball track of an outer race 10. To the holow shaft 12, at its end remote from the honing stone, there is keyed a crank arm 13 which is driven by means of a crank drive or an eccentric drive from a motor in such a manner that the hollow shaft 12 executes, about its axis, an oscillating motion having an amplitude of a few degrees. A push rod 14 which is axially held within the hollow shaft 12 by means of positioning rings 15 rotating with shaft 12 as a unit, serves to lower the honing stone 11 onto the ball track of race 10 and to lift the same therefrom when it is axially displaced with respect to the hollow shaft 12. The positioning ring 15, which is adjacent the honing stone 11, serves as an abutment or support for a link 16 to which there is pivotally attached a lever 17 carrying the honing stone 11. The oscillation is made possible by an arm which is connected to the lever 17 and which is moved by the push rod 14, during its longitudinal displacement, through the link 18.

On the hollow shaft 12 there are mounted two taper roller bearings 19, the outer races of which carry a single sleeve 20. Within the sleeve 20 between the outer races of roller bearings 19, there are disposed two spacer rings 21 separated from one another by the outer ring of a free-wheeling member 22, the inner ring of which is mounted on the hollow shaft 12. The sleeve 20 is rotatably supported in a stationary carrier or bearing housing 24 by means of two ball bearings 23.

The two ball bearings 23, as well as the two roller bearings 19, are tensioned against one another. The inner races of the latter are axially so loaded, on the one hand, by means of a flange 12a of the hollow shaft 12, and, on the other hand, by means of an adjusting ring 26 threadedly mounted on the hollow shaft 12 that they tend to shorten their axial distance. As soon as the force with which the adjusting ring 26 bears on the inner race of the roller bearing 19 remote from work 10 becomes weaker because of a wear in the roller bearings 19, the adjusting ring 26 is turned through an angle to advance in the direction of the inner race to an extent which is large enough to re-establish the originally set axial force. The aforenoted axial tensioning forces are generated by virtue of the fact that the outer races of this bearing are prevented by the spacing rings 21 from participating in a displacement in response to the readjustment.

The ball bearings 23 are pressed against one another in a similar manner: their outer races are loaded in such a manner by tightening the adjustment ring 27 that they tend to shorten their mutual distance, whereas the spacing of their inner races is maintained by the spacer rings 25.

If, for example, the hollow shaft 12 turns clockwise, the sleeve 20 is carried by the freewheeling member 22 in the same direction of rotation. As soon as the direction of motion is reversed, the transmission of torque from the hollow shaft 12 to the sleeve 20 is interrupted so that the latter at all times and approximately continuously moves in a clockwise direction. Dependent upon the structure of the freewheeling member, the operational steps may occur in an inverse direction.

Figure 2:
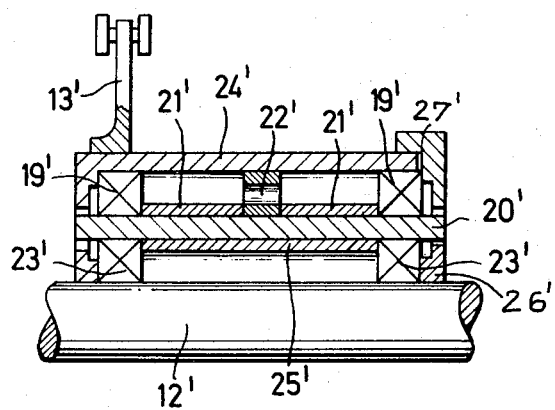
FIG. 2 is a fragmentary sectional view of a second embodiment of the invention.

Turning now to the embodiment illustrated in FIG. 2, here the shaft 12' serves as a stationary carrier for the bearing housing 24' which, driven by a crank arm 13', executes oscillating motions about the axis of shaft 12'. The four roller bearings described and shown in the embodiment according to FIG. 1, are in FIG. 2 only symbolically shown by rectangles and designated with 19' and 23'. Similarly to the previously described embodiment, they are tensioned to one another by means of adjusting rings 26' and 27'. The inner ring of the freewheeling member 22' is, in this embodiment, attached to the sleeve 20'. The spacer ring 21' flanking the inner ring of the freewheeling member are mounted on the sleece 20', while the spacer sleeve 25' is inserted into sleeve 20'. The arrangement of the components maintaining the distance between the roller bearing races is reversed with respect to the embodiment of FIG. 1. Also, the structure of the freewheeling members is different. While the inner ring of the freewheeling member 22 drives its outer ring only in one direction, the drive means for the inner ring of the freewheeling member 22' is derived from its outer ring, causing the inner ring to move in a predetermined direction.

It is to be understood that the field of application of the invention is by no means limited to the example described: it may be used in all instances where movable parts are to be supported which oscillate with an amplitude less than 360°.

What is claimed is:

1. In a bearing assembly, particularly for supporting a part executing a rotary oscillating motion through an angle less than 360°, the improvement comprising,
   (A) a stationary carrier,
   (B) at least one roller bearing having
      (1) a first race in engagement with said oscillating part,
      (2) a second race supported by said carrier and rotatable with respect to said carrier and said oscillating part,
   (C) means imparting a unidirectional rotary motion to said second race during oscillation of said part, and
   (D) means associated with said second race to oscillate a work-engaging tool.

2. An improvement as defined in claim 1, where said means imparting a unidirectional rotary motion to said second race is a freewheeling member driven by said oscillating part and connected to said second race.

3. An improvement as defined in claim 2, including a sleeve coaxially disposed with respect to said oscillating part, said sleeve is, at axially spaced locations, in engagement with said second race and said freewheeling member to constitute a driving connection therebetween.

4. An improvement as defined in claim 3 including additional bearing means to rotatably support said sleeve with respect to said stationary carrier.

5. An improvement as defined in claim 4, wherein said oscillating part is formed of a central shaft or spindle; said first race and said freewheeling member are axially spaced from one another and are circumferentially mounted on said spindle; said sleeve surrounds said second race and said freewheeling member; said stationary carrier is formed of a housing surrounding said sleeve.

6. An improvement as defined in claim 4, wherein said oscillating part is formed of a housing; said first race and said freewheeling member are axially spaced from one another and engage the inner circumference of said housing, said sleeve is surrounded by said second race and said freewheeling member; said stationary carrier is formed of a central shaft surrounded by said sleeve.

References Cited
UNITED STATES PATENTS

| | | | |
|---|---|---|---|
| 1,574,470 | 2/1926 | Coffee | 308—F.B. |
| 2,673,746 | 3/1954 | Thompson | 308—F.B. |

MARTIN P. SCHWADRON, Primary Examiner

F. SUSKO, Assistant Examiner